(12) United States Patent
Wang et al.

(10) Patent No.: US 11,821,853 B2
(45) Date of Patent: Nov. 21, 2023

(54) FAST INDUSTRIAL CT SCANNING SYSTEM AND METHOD

(71) Applicant: Shandong University, Jinan (CN)

(72) Inventors: Jipeng Wang, Jinan (CN); Xuguang Gao, Jinan (CN); Jiyuan Luan, Jinan (CN); Taiheng Liu, Jinan (CN); Junfeng Sha, Jinan (CN); Meng Qi, Jinan (CN)

(73) Assignee: Shandong University, Jinan (CN)

( * ) Notice: Subject to any disclaimer, the term of this patent is extended or adjusted under 35 U.S.C. 154(b) by 108 days.

(21) Appl. No.: 17/505,082

(22) Filed: Oct. 19, 2021

(65) Prior Publication Data

US 2022/0244196 A1 Aug. 4, 2022

(30) Foreign Application Priority Data

Jan. 29, 2021 (CN) .......................... 202110124424.9

(51) Int. Cl.
*G01N 23/046* (2018.01)
*G01N 23/083* (2018.01)

(52) U.S. Cl.
CPC ......... *G01N 23/046* (2013.01); *G01N 23/083* (2013.01); *G01N 2223/3306* (2013.01)

(58) Field of Classification Search
CPC ............... G01N 23/046; G01N 23/083; G01N 2223/3306
See application file for complete search history.

(56) References Cited

U.S. PATENT DOCUMENTS

| | | | | |
|---|---|---|---|---|
| 4,143,273 A | * | 3/1979 | Richey | G21K 1/04 378/7 |
| 4,166,231 A | * | 8/1979 | Braun | H01J 35/18 378/147 |

(Continued)

FOREIGN PATENT DOCUMENTS

| | | |
|---|---|---|
| CN | 103760180 A | 4/2014 |
| CN | 103913779 A | 7/2017 |
| CN | 206541634 U | 10/2017 |

OTHER PUBLICATIONS

First Office Action dated Nov. 3, 2021 issued in Chinese Patent Application No. 202110124424.9.

(Continued)

*Primary Examiner* — Blake C Riddick
(74) *Attorney, Agent, or Firm* — TROUTMAN PEPPER HAMILTON SANDERS LLP; Christopher C. Close, Jr.

(57) ABSTRACT

A fast industrial CT scanning system and a method are provided. The scanning system includes X-ray sources, detectors, a rotating table, control boxes, and a control unit. The X-ray sources, the detectors, the rotating table, and the control boxes are all connected to the control unit. The rotating table is used for placing a specimen detected. Three X-ray sources are annularly and uniformly arranged at an interval of 120° by taking an axis of the rotating table as a center. Distances from the three X-ray sources to the specimen detected are equal. Each X-ray source is mounted in a corresponding control box. Three detectors are annularly and uniformly arranged at an interval of 120° by taking the axis of the rotating table as a center. Distances from the three detectors to the specimen detected are equal.

8 Claims, 4 Drawing Sheets

(56) References Cited

U.S. PATENT DOCUMENTS

| | | | | |
|---|---|---|---|---|
| 4,196,352 A * | 4/1980 | Berninger | A61B 6/4007 | 378/7 |
| 4,250,425 A * | 2/1981 | Gabbay | H01J 35/30 | 378/150 |
| 4,303,830 A * | 12/1981 | Heinzelmann | H02G 11/02 | 378/4 |
| 4,321,473 A * | 3/1982 | Albert | H05G 1/66 | 378/148 |
| 4,323,779 A * | 4/1982 | Albert | A61B 6/4028 | 378/38 |
| 4,417,354 A * | 11/1983 | Pfeiler | A61B 6/4411 | 378/19 |
| 4,686,695 A * | 8/1987 | Macovski | A61B 6/482 | 378/146 |
| 4,951,222 A * | 8/1990 | Hoffman | G01N 23/046 | 250/359.1 |
| 4,991,190 A * | 2/1991 | Mori | A61B 6/032 | 378/19 |
| 5,023,895 A * | 6/1991 | McCroskey | G01N 23/046 | 378/177 |
| 5,187,659 A * | 2/1993 | Eberhard | A61B 6/027 | 378/15 |
| 5,333,164 A * | 7/1994 | Tam | G01N 23/046 | 378/8 |
| 5,365,560 A * | 11/1994 | Tam | G06T 11/005 | 378/8 |
| 5,740,224 A * | 4/1998 | Muller | G01N 23/044 | 378/11 |
| 5,966,422 A * | 10/1999 | Dafni | A61B 6/482 | 378/15 |
| 6,483,892 B1 * | 11/2002 | Wang | A61B 6/508 | 378/43 |
| 6,873,677 B2 * | 3/2005 | Kaufman | A61B 6/032 | 378/10 |
| 6,876,719 B2 * | 4/2005 | Ozaki | A61B 6/032 | 378/7 |
| 7,016,455 B2 * | 3/2006 | Bruder | A61B 6/032 | 378/197 |
| 7,039,153 B2 * | 5/2006 | Bruder | G01N 23/046 | 378/9 |
| 8,000,436 B2 * | 8/2011 | Seppi | G01N 23/046 | 378/57 |
| 2002/0018542 A1 * | 2/2002 | Fenkart | G01N 23/046 | 378/57 |
| 2002/0106056 A1 * | 8/2002 | Mattson | H01J 35/26 | 378/140 |
| 2006/0023835 A1 * | 2/2006 | Seppi | G01V 5/005 | 378/57 |
| 2006/0210015 A1 * | 9/2006 | Pelc | G01T 1/2985 | 378/9 |
| 2007/0280408 A1 * | 12/2007 | Zhang | H05G 1/70 | 378/146 |
| 2008/0118023 A1 * | 5/2008 | Besson | A61B 6/4216 | 604/510 |
| 2008/0170655 A1 * | 7/2008 | Bendahan | G01V 5/005 | 378/9 |
| 2008/0212734 A1 * | 9/2008 | Kasperl | G01T 1/2985 | 378/207 |
| 2009/0003516 A1 * | 1/2009 | Chen | A61B 6/587 | 378/19 |
| 2009/0067575 A1 * | 3/2009 | Seppi | G01N 23/046 | 378/57 |
| 2009/0074136 A1 * | 3/2009 | Kamegawa | G01N 23/046 | 378/98.3 |
| 2009/0213989 A1 * | 8/2009 | Harding | G21K 1/02 | 378/57 |
| 2009/0213994 A1 * | 8/2009 | Warner | G21K 1/025 | 378/147 |
| 2009/0232277 A1 * | 9/2009 | Hopkins | G01N 23/046 | 378/57 |
| 2011/0158379 A1 * | 6/2011 | Cheon | G21K 7/00 | 378/4 |
| 2012/0140876 A1 * | 6/2012 | Jung | G01N 23/046 | 378/20 |
| 2013/0177131 A1 * | 7/2013 | Teng | A61B 6/06 | 378/4 |
| 2014/0086380 A1 * | 3/2014 | Song | H01L 23/373 | 378/4 |
| 2014/0353514 A1 * | 12/2014 | Unfors | G01T 1/026 | 250/370.07 |
| 2015/0257717 A1 * | 9/2015 | Asento | A61B 6/04 | 378/4 |
| 2016/0166223 A1 * | 6/2016 | Besson | A61B 6/4007 | 378/9 |
| 2017/0059493 A1 * | 3/2017 | Kingston | G01N 23/046 | |
| 2017/0350833 A1 * | 12/2017 | Ju | G01N 23/046 | |
| 2018/0045660 A1 * | 2/2018 | Yashima | G01N 23/18 | |
| 2018/0144462 A1 * | 5/2018 | Lee | G06T 11/60 | |
| 2018/0144511 A1 * | 5/2018 | Lee | G06T 7/337 | |
| 2019/0250111 A1 * | 8/2019 | Salamon | G01N 23/046 | |
| 2019/0274654 A1 * | 9/2019 | Matsumiya | G01N 23/046 | |
| 2019/0277779 A1 * | 9/2019 | Wuestenbecker | G01N 23/046 | |
| 2019/0277780 A1 * | 9/2019 | Asano | G01N 23/083 | |
| 2019/0360947 A1 * | 11/2019 | Ocken | G01N 23/046 | |
| 2020/0080946 A1 * | 3/2020 | Muehlhauser | G01N 23/046 | |
| 2020/0141884 A1 * | 5/2020 | Goto | G01N 23/046 | |
| 2020/0182807 A1 * | 6/2020 | Butani | G01N 23/20025 | |
| 2020/0326289 A1 * | 10/2020 | Takeda | G06T 15/08 | |
| 2021/0072168 A1 * | 3/2021 | Sasaki | G06T 7/80 | |
| 2021/0161486 A1 * | 6/2021 | Giani | A61B 6/4435 | |
| 2022/0409148 A1 * | 12/2022 | Rose | A61B 6/12 | |
| 2023/0011644 A1 * | 1/2023 | Zhao | A61B 6/542 | |
| 2023/0015121 A1 * | 1/2023 | Sheng | A61N 5/1081 | |

OTHER PUBLICATIONS

Second Office Action dated Jan. 6, 2022 issued in Chinese Patent Application No. 202110124424.9.

* cited by examiner

FAST INDUSTRIAL CT SCANNING SYSTEM AND METHOD

CROSS REFERENCE TO RELATED APPLICATIONS

This patent application claims the benefit and priority of Chinese Patent Application No. 202110124424.9 filed on Jan. 29, 2021, the disclosure of which is incorporated by reference herein in its entirety as part of the present application.

TECHNICAL FIELD

The present disclosure relates to the field of X-ray fast industrial CT scanning, detection and imaging technologies, and in particular, to a fast industrial CT scanning system and a method.

BACKGROUND ART

An X-ray industrial Computed Tomography (referred briefly to as CT) scanning technology, as an important microscopic detection and analysis means, has the advantages of nondestructive, dynamic, and quantitative detection; hierarchical identification of both internal composition and an internal structure of a material; high resolution; and digital image display, etc. In recent years, the X-ray industrial CT scanning technology has made great progress in terms of nondestructive detection, phase composition and distribution, micro-structure analysis, and material migration, and so on of materials. Furthermore, the X-ray industrial CT scanning technology has been widely used in professional fields, such as aerospace, military, nuclear waste, machinery, materials, microelectronics, archaeology, biology, and geotechnical microscopic experiments, and so on.

In conventional industrial CT scanning and imaging with a single source and a single detector, a specimen detected is usually carried by a rotating table to rotate 360°. X-rays with certain energy and intensity that are emitted by a ray source can penetrate through the specimen detected to perform tomography on the specimen. The detector converts projection data of section slices of the specimen at different angles, which is collected in a rotating and scanning process of the specimen, into digital information. Then, the detector transmits the digital information to a computer application system. Finally, a three-dimensional model of the specimen detected is reconstructed by using computer information processing and image reconstruction algorithms. The essence of the X-ray industrial CT scanning technology is that a CT image is reconstructed by a computer application system based on multiple groups of projection data of a scanned cross section. The image quality of the CT imaging is closely related to the data volume of the scanning projection. Generally, the data volume of the scanning projection of the CT is more, and thus the signal-to-noise ratio of the reconstructed image is decreased. So, detailed features of the interior of the specimen can be better depicted, and the image quality of the CT imaging is higher. However, the scanning time and the radiation time of the specimen are increased accordingly. Therefore, the scanning and imaging speed as well as the imaging quality of the conventional CT with the single source and the single detector are mutually restricted, which can only be selected in a compromised manner in actual application. It is very difficult to obtain high quality scanning results in CT scanning tests with the relatively high reaction rate, such as hydration of cement, a battery charge and discharge, a consolidated quick shear test, and so on.

At present, the multi-source CT scanning based on a circular track has a certain applications in the medical field. Although the detection speed of the above multi-source CT scanning is improved, the energy intensity of rays is low due to the fact that a detection target of the medical CT is a human body and an organ, which is not suitable for detecting a high-density mechanical metal material and cannot perform accurate measurement and quantitative analysis of sizes and tolerances.

Therefore, in order to meet the requirements of an industrial CT system in terms of fast scanning, high quality imaging, and so on, and to improve the detection efficiency, it is urgent to provide a new fast industrial CT scanning system and a method.

SUMMARY

An objective of the present disclosure is to provide a fast industrial CT scanning system and a method to solve the above-mentioned problems in the prior art, which can shorten two-thirds of scanning time (i.e., data acquisition time) under the same parameter condition as the CT scanning with a single source and a single detector while meeting high-quality imaging of the CT scanning, and can further improve the detection efficiency.

To achieve the above-mentioned objective, the present disclosure provides the following technical solution. A fast industrial CT scanning system is provided, which includes three X-ray sources, three detectors, a rotating table, control boxes, and a control unit; wherein the rotating table, the three detectors, and the control boxes, and the three X-ray sources are connected to the control unit; the rotating table is used for placing a specimen detected; the three X-ray sources are annularly and uniformly arranged by taking an axis of the rotating table as a center; first distances from the three X-ray sources to the specimen detected are equal; each of the three X-ray sources is mounted in a corresponding one of the control boxes; the three detectors are annularly and uniformly arranged by taking the axis of the rotating table as the center; and second distances from the three detectors to the specimen detected are equal. The axis may be penetrated through a center of the rotating table and extended along a height direction of the rotating table.

Preferably, the three X-ray sources are respectively a first X-ray source, a second X-ray source, and a third X-ray source; the first X-ray source, the second X-ray source, and the third X-ray source are annularly and uniformly arranged at an interval of 120° by taking the axis of the rotating table as the center; and the three X-ray sources work individually and simultaneously.

Preferably, the control boxes include three control boxes, the three control boxes include a first control box, a second control box, and a third control box; the first X-ray source, the second X-ray source, and the third X-ray source are respectively mounted in the first control box, the second control box and the third control box.

Preferably, a front portion of each of the control boxes is formed with an opening used for enabling X-rays emitted from a corresponding one of the three X-ray sources to pass; an opening size adjustment device is arranged at the opening of each of the control boxes; and the opening size adjustment device is connected to the control unit.

Preferably, the three detectors are respectively a first detector, a second detector, and a third detector; the first detector, the second detector, and the third detector are annularly and uniformly arranged at an interval of 120° by taking the axis of the rotating table as the center; and the three detectors work individually and simultaneously.

Preferably, the rotating table is further connected to a lifting device used for driving the rotating table to move up and down; and the lifting device is connected to the control unit.

Preferably, a sliding rail is arranged below each of the control boxes; another sliding rail is arranged below each of the three detectors; each of the control boxes is mounted on the sliding rail through a respective rack and moved back and forth along the sliding rail; and each of the three detectors is mounted on the another sliding rail through another respective rack and moved back and forth along the another sliding rail.

Preferably, each of the control boxes is connected to a driving device; each of the three detectors is connected to another driving device; and the driving device and the another driving device are connected to the control unit.

Preferably, the monitoring equipment is connected to the control unit.

The present disclosure further discloses a fast industrial CT scanning method, which includes: selecting a specimen detected to undergo a CT scanning test; fixing the specimen detected to a sample bracket, and mounting the specimen detected on a rotating table; turning on a monitoring equipment through a control unit; based on a requirement of imaging magnification and another requirement of imaging quality, turning on three X-ray sources through the control unit, and adjusting front and rear positions of the three X-ray sources and three detectors, as well as up and down positions of the rotating table, such that the three X-ray sources, the rotating table, and the three detectors are enabled to be determined at imaging positions; adjusting sizes of openings of control boxes through the control unit after the three X-ray sources, the rotating table, and the three detectors are determined to be at the imaging positions, such that scattering angles of the three X-ray sources are controlled; setting related parameters of CT scanning based on the another requirement of the imaging quality, starting scanning, enabling the specimen detected to rotate 120° along with rotation of the rotating table during scanning, so as to scan at different angles and obtain sliced gray scale images; projecting X-rays emitted from each of the three X-ray sources to a corresponding one of the three detectors after the X-rays penetrate through the specimen detected in the CT scanning, wherein the three detectors convert and transmit projection data individually; integrating and rearranging the projection data converted and transmitted by the three detectors during the scanning to reconstruct complete CT scanning projection data and obtain completed sliced gray scale images, based on a multi-source CT scanning graph reconstruction algorithm of the control unit; ending the scanning, and reconstructing images with different gray scale values, which is obtained after ending the scanning, to be a complete three-dimensional image model of the specimen detected, through information processing and an image reconstruction technology of the control unit.

Compared with the prior art, the present disclosure achieves the following beneficial technical effects.

1. Compared with the scanning method of the conventional industrial CT with the single source and the single detector, the specimen needs to be rotated 360° during scanning, whereas three sources and three detectors in the present disclosure work simultaneously; and under the same condition, there needs to only rotate 120° to scan the specimen to obtain a same scanning result as a result obtained by enabling the conventional industrial CT with the single source and the single detector to rotate 360°. So, two-thirds scanning time is shortened while the imaging quality of the CT scanning is guaranteed to be unchanged, which greatly improves the detection efficiency.

2. Compared with the medical CT scanning with multiple sources and multiple detectors, in the present disclosure, a fast industrial CT scanning system and a method which combines three sources and three detectors not only can improve the detection speed, but also can be used for detecting a high-density mechanical metal material and performing accurate measurement and quantitative analysis of sizes and tolerances. performing accurate measurement and quantitative analysis of sizes and tolerances. Moreover, the ray sources and detectors in the disclosure can move back and forth along the respective slide rails, so the image magnification is adjustable.

3. Due to the fact that the fast industrial CT scanning system and the method can guarantee a high-quality imaging result and can greatly improve the detection speed, the fast industrial CT scanning system and the method can satisfy the use requirements of the industrial CT system in CT scanning tests with the relatively high reaction rate, such as hydration of cement, a battery charge and discharge, a consolidated quick shear test and so on, which enlarges the application range of the industrial CT system.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description are merely some embodiments of the present disclosure, and those of ordinary skill in the art may still derive other drawings from these accompanying drawings without creative efforts.

Figure 1:
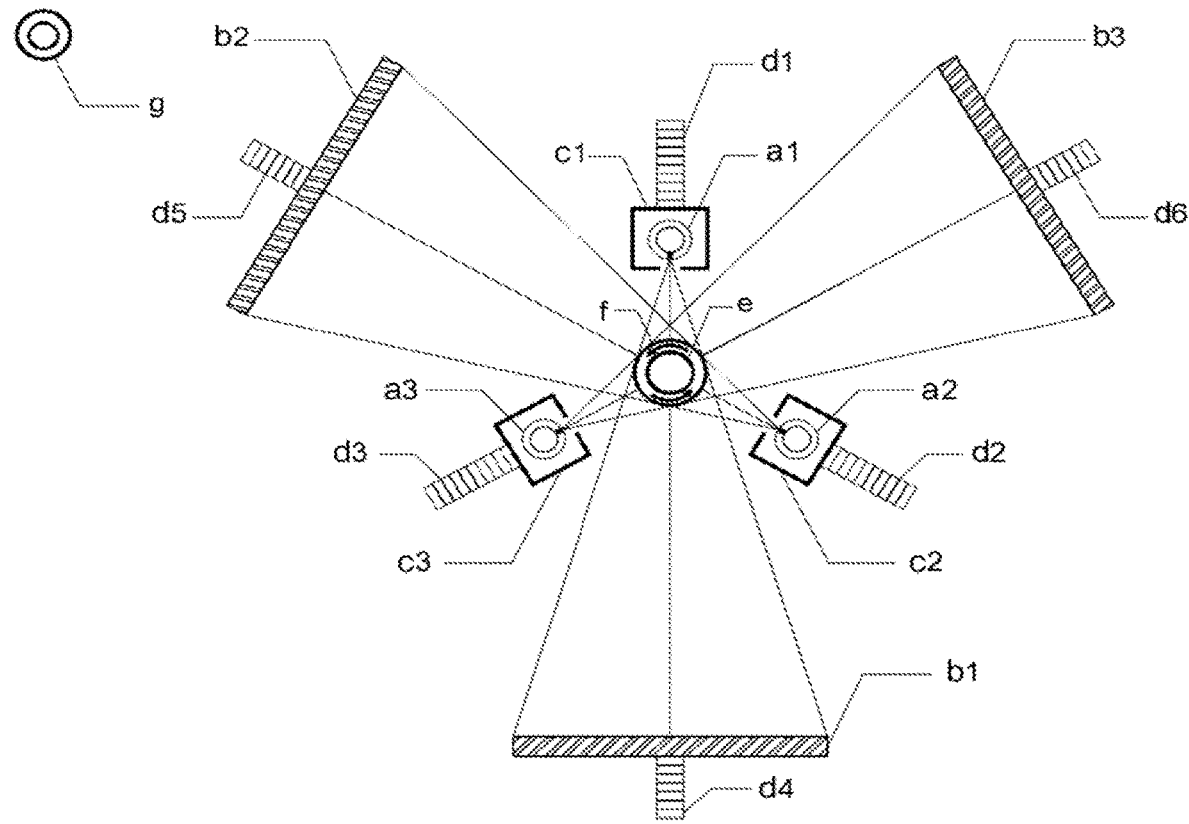
FIG. 1 is a schematic structural diagram of a fast industrial CT scanning system according to an embodiment of the present disclosure.

Reference signs in the drawings: a1—first X-ray source, a2—second X-ray source, a3—third X-ray source, b1—first detector, b2—second detector, b3—third detector, c1—first control box, c2—second control box, c3—third control box, d1—first sliding rail, d2—second sliding rail, d3—third sliding rail, d4—fourth sliding rail, d5—fifth sliding rail, d6—sixth sliding rail, e—specimen detected, f—rotating table, and g—monitoring equipment.

DETAILED DESCRIPTION OF THE EMBODIMENTS

Technical solutions in the embodiments of the present disclosure will be clearly and completely described herein below with reference to the accompanying drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

An objective of the present disclosure is to provide a fast industrial CT scanning system and a method to solve the above-mentioned problems in the prior art. The fast industrial CT scanning system and the method can shorten two-thirds of scanning time (i.e., the projection data acquisition time) under the same parameter condition as the CT scanning with the single source and the single detector while meeting the high-quality imaging of the CT scanning, which improves the detection efficiency.

In order to make the above-mentioned objective, features, and advantages of the present disclosure more apparent and more comprehensible, the present disclosure is further described in detail below with reference to the accompanying drawings and specific implementation manners.

Example 1

Figure 2:
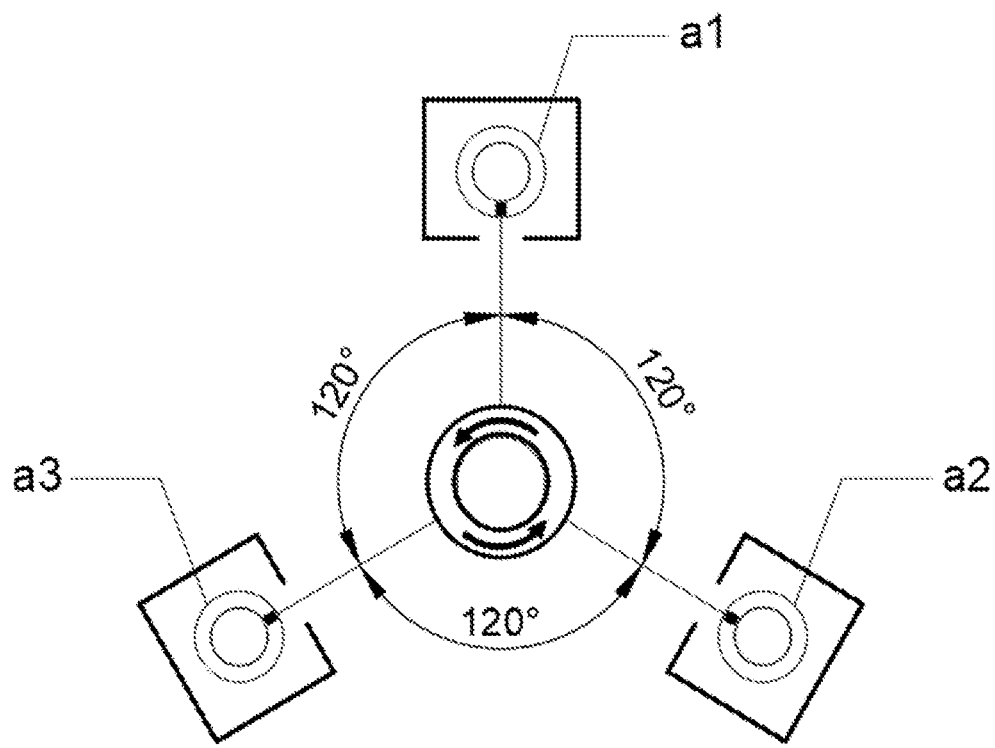
FIG. 2 is an angle distribution diagram of three X-ray sources according to an embodiment of the present disclosure.
Figure 3:
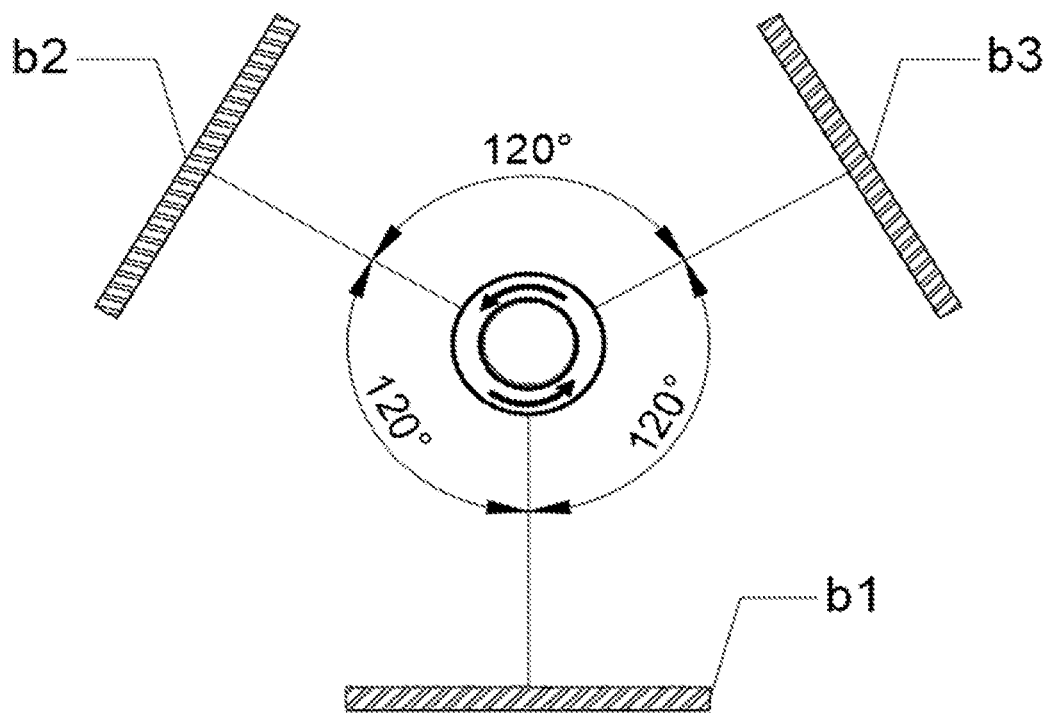
FIG. 3 is an angle distribution diagram of three detectors according to an embodiment of the present disclosure.
Figure 4:
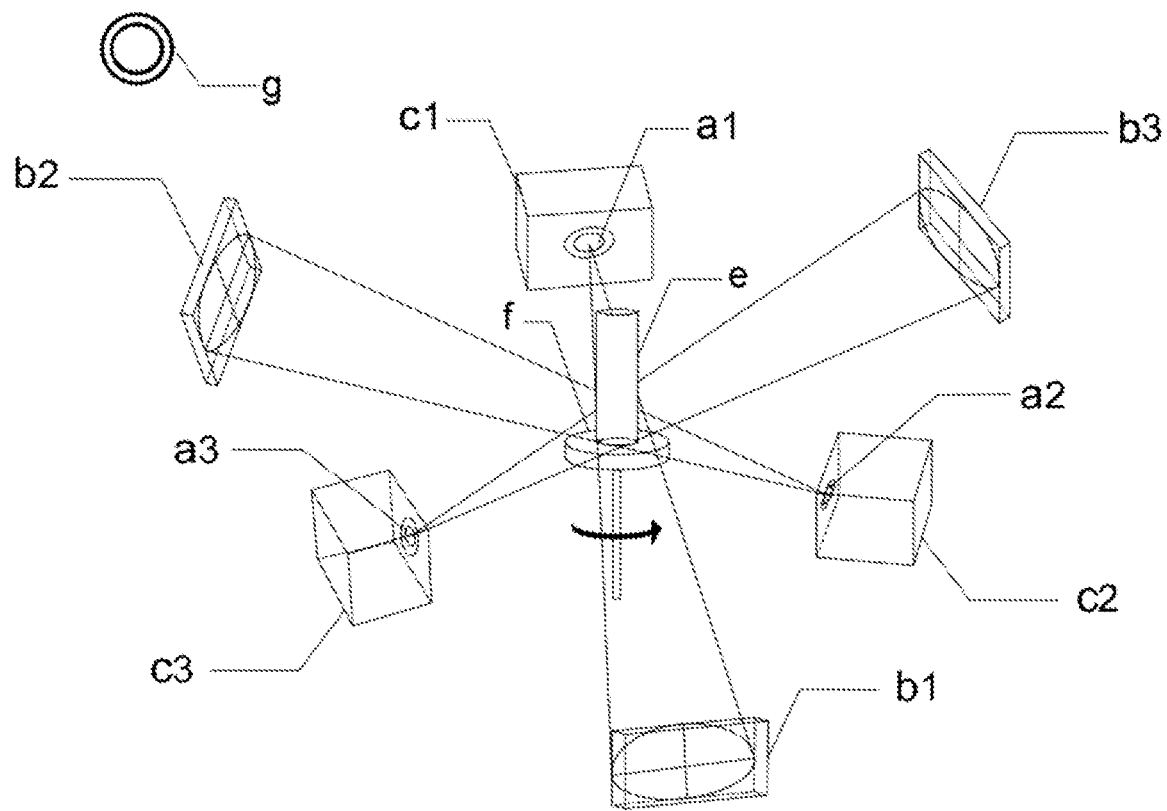
FIG. 4 is a working schematic diagram of the fast industrial CT scanning system according to an embodiment of the present disclosure.

As shown in FIG. 1 to FIG. 4, the example provides a fast industrial CT scanning system, which includes a rotating table f, detectors, control boxes, X-ray sources, and a control unit. The rotating table f, the detectors, the control boxes, and the X-ray sources are all connected to the control unit. Electrical elements of the overall scanning system are controlled through the control unit. The rotating table f is used for placing a specimen detected e. Three X-ray sources are arranged, and the three X-ray sources are used for providing X-rays with certain energy and intensity to penetrate through the specimen detected e. The three X-ray sources are annularly and uniformly distributed by taking an axis of the rotating table f as a center. The distances from the three X-ray sources to the specimen detected e are equal. Each X-ray source is mounted in a corresponding control box. Three detectors are arranged, and three detectors are used for collecting signals of rays after penetrating through the specimen detected e. The signals of rays are subjected to amplification and digital information conversion, and then transmitted to a computer application system for image reconstruction. The three detectors are annularly and uniformly distributed by taking the axis of the rotating table f as the center. The distances from the three detectors to the specimen detected e are equal.

In the example, three identical X-ray sources are arranged. The three identical X-ray sources include a first X-ray source a1, a second X-ray source a2, and a third X-ray source a3. The first X-ray source a1, the second X-ray source a2, and the third X-ray source a3 are annularly and uniformly distributed at an interval of 120° by taking the axis of the rotating table f as a center. Three control boxes are arranged. The three control boxes include a first control box c1, a second control box c2, and a third control box c3. The first X-ray source a1, the second X-ray source a2, and the third X-ray source a3 are respectively arranged in the first control box c1, the second control box c2, and the third control box c3.

In the example, an opening is formed in a front portion of each control box, and is used for enabling the X-rays emitted from the X-ray source to pass. An opening size adjustment device is arranged at the opening of the control box. The opening size adjustment device is connected to the control unit. The opening size adjustment device is controlled through the control unit to adjust size of the opening of the control box. The opening size adjustment device adopts a conventional opening and closing device for an electric door. The opening and closing degrees of the opening and closing device for the electric door are controlled through the control unit to adjust the size of the opening of the control box. Other opening size adjustment devices may also be selected according to specific work requirements.

In the example, the size of a scattering angle of the X-ray source may be controlled by adjusting the size of the opening of the control box, which is adapted to specimen detected e with different sizes. Furthermore, the X-rays emitted from each of the three X-ray sources are limited to projecting to the respective detector in a specimen scanning process, and not projected to an adjacent detector of this X-ray source, thereby avoiding artifacts.

In the example, there are three detectors. The three detectors include a first detector b1, a second detector b2, and a third detector b3. The first detector b1, the second detector b2, and the third detector b3 are annularly and uniformly distributed by taking the axis of the rotating table f as a center.

In the example, a sliding rail is arranged below each control box, and a sliding rail is also arranged below each detector. The control box and the detector are each mounted on a corresponding sliding rail through a respective rack, and can move back and forth on the respective sliding rail. Specifically, the first control box c1, the second control box c2, and the third control box c3 are respectively arranged on a first sliding rail d1, a second sliding rail d2, and a third sliding rail d3 in a sliding manner. The X-ray sources are driven to move through the movements of the respective control boxes. The first detector b1, the second detector b2, and the third detector b3 are respectively mounted on a fourth sliding rail d4, a fifth sliding rail d5, and a sixth sliding rail d6.

In the example, the distance between the specimen detected e and the X-ray sources, and the distance between the specimen detected e and the detectors may be adjusted through the control unit according to the requirements of imaging quality and magnification, so as to determine imaging positions.

In the example, each control box and each detector are connected to a respective driving device. The control box and the detector are each driven to move back and forth on the corresponding sliding rail through the respective driving device. The driving device selects a commonly used air cylinder, a driving motor, or the like as required. The driving device is connected to the control unit.

In the example, the rotating table f is an existing device, and can rotate freely around its own center. In addition, the rotating table f may also be connected to a lifting device, such as a telescopic rod or a hydraulic cylinder, so as to drive the rotating table f to move up and down. The lifting device is connected to the control unit. The rotating table f of the example can move up and down and freely rotate around the center thereof, so as to ensure that more rays penetrate through the specimen detected. In a CT scanning process, the rotating table f only needs to drive the specimen detected e to rotate 120°.

In the example, the fast industrial CT scanning system further includes a monitoring equipment g. The monitoring equipment g is connected to the control unit, and may be used for monitoring a scanning process of the specimen detected e and a running state of the equipment in real time. The monitoring equipment g adopts a commonly used high-definition camera.

In the example, the control unit adopts a computer. Through computer application software, turn-on and turn-off of the X-ray sources and turn-on and turn-off of the monitoring equipment g can be controlled, the rotating table f can be adjusted to move up and down and rotate, the sizes of the openings of the control boxes can be adjusted, and the X-ray sources, the detectors, and the control boxes can be controlled to move back and forth along the respective sliding rails. The computer application software has an accurate and fast three-source CT scanning image reconstruction algorithm, which can realize integration and rearrangement of the projection data collected by the three detectors in the scanning process. So, a complete set of CT scanning projection data can be reconstructed, and calibration and correction can be performed.

The embodiment further discloses a fast industrial CT scanning method, which includes the following steps one to nine.

In step one, a specimen, i.e., a specimen detected e, is selected to undergo a CT scanning test.

In step two, the specimen detected e is fixed to a sample bracket and is mounted on a rotating table f.

In step three, monitoring equipment g is turned on through a control unit.

In step four, based on the requirements of imaging quality and imaging magnification, three X-ray sources are turned on through the control unit, and front and rear positions of the X-ray sources and front and rear positions of the detectors, as well as up and down positions of the rotating table f are adjusted, so that the X-ray sources, the rotating table, and the detectors are guarantee to be determined at imaging positions, and the distances from the three X-ray sources to the specimen detected e are enabled to be equal, and the distances from the three detectors to the specimen detected e are enable to be equal.

In step five, after the X-ray sources, the rotating table f, and the detectors are determined to be at the imaging positions, the sizes of the openings of the control boxes are automatically adjusted through the computer control unit, so as to control the scattering angles of the X-ray sources; the X-rays emitted from each of the three X-ray sources are limited to projecting to a corresponding detector after penetrating through the specimen detected e, and are not projected to an adjacent detector of this X-ray source.

In step six, related parameters of CT scanning are set through the computer according to the requirement of the imaging quality; scanning is started; and the specimen detected e rotates 120° along with the rotating table f during scanning, so as to scan at different angles and obtain sliced gray scale images.

In step seven, in a CT scanning process, the X-rays emitted from the first X-ray source a1 are projected to the first detector b1 after penetrating through the specimen detected e; the X-rays emitted from the second X-ray source a2 are projected to the second detector b2 after penetrating through the specimen detected e, and the X-rays emitted from the third X-ray source a3 are projected to the first detector b3 after penetrating through the specimen detected e; and the three detectors convert and transmit projection data individually.

In step eight, the projection data converted and transmitted by the three detectors during the scanning are integrated and rearranged to reconstruct a complete set of CT scanning projection data and obtain completed sliced gray scale images, based on a researched three-source CT scanning image reconstruction algorithm that is accurate and fast.

In step nine, the scanning is ended, images with different gray scale values, which is obtained after ending the scanning, are reconstructed to be a complete three-dimensional image model of the specimen, through information processing and an image reconstruction technology via the processing unit of the computer.

For those skilled in the art, it is obvious that the present disclosure is not limited to the details of the above exemplary embodiments, and can be implemented in other specific forms without departing from the spirit or basic features of the present disclosure. Therefore, from any point of view, the embodiments should be regarded as exemplary but not restrictive. The scope of the present disclosure is limited by the attached claims rather than the above description. Therefore, it is intended to include all changes within the meaning and scope of the equivalent elements of the claims in the present disclosure, and any numeral in the claims shall not be regarded as limiting the claims involved.

In the present disclosure, specific examples are applied to illustrate the principle and implementation manner of the present disclosure. The description of the above embodiment is only used to help understand the method and core idea of the present disclosure. Meanwhile, for those of ordinary skill in the art, there will be changes in the specific implementation manner and scope of application according to the idea of the present disclosure. In conclusion, the content of the present description shall not be construed as a limitation to the present disclosure.

What is claimed is:

1. An industrial CT scanning system, comprising three X-ray sources, three detectors, a rotating table, control boxes, and a computer; wherein the rotating table, the three detectors, the control boxes, and the three X-ray sources are connected to the computer; the rotating table is used for placing a specimen detected; the three X-ray sources are annularly and uniformly arranged by taking an axis of the rotating table as a center; first distances from the three X-ray sources to the specimen detected are equal; each of the three X-ray sources is mounted in a corresponding one of the control boxes; the three detectors are annularly and uniformly arranged by taking the axis of the rotating table as the center; and second distances from the three detectors to the specimen detected are equal;

wherein a front portion of each of the control boxes is formed with an opening used for enabling X-rays emitted from a corresponding one of the three X-ray sources to pass; an electrically-controlled door is arranged at the opening of each of the control boxes; the electrically-controlled door is connected to the computer, and is configured to adjust an size of the opening to control scattering angles of the three X-ray sources;

wherein a sliding rail is arranged below each of the control boxes; another sliding rail is arranged below each of the three detectors; each of the control boxes is mounted on the sliding rail through a respective rack and moved back and forth along the sliding rail; and each of the three detectors is mounted on the another sliding rail through another respective rack and moved back and forth along the another sliding rail, front and rear positions of the three X-ray sources and three detectors are adjustable through the computer based on a requirement of imaging magnification and another requirement of imaging quality.

2. The industrial CT scanning system according to claim 1, wherein the three X-ray sources are respectively a first X-ray source, a second X-ray source, and a third X-ray source; the first X-ray source, the second X-ray source, and the third X-ray source are annularly and uniformly arranged at an interval of 120° by taking the axis of the rotating table as the center; and the three X-ray sources work individually and simultaneously.

3. The industrial CT scanning system according to claim 2, wherein the control boxes comprise three control boxes, the three control boxes comprise a first control box, a second control box, and a third control box; the first X-ray source, the second X-ray source, and the third X-ray source are respectively mounted in the first control box, the second control box and the third control box.

4. The industrial CT scanning system according to claim 1, wherein the three detectors are respectively a first detector, a second detector, and a third detector; the first detector, the second detector, and the third detector are annularly and uniformly arranged at an interval of 120° by taking the axis of the rotating table as the center; and the three detectors work individually and simultaneously.

5. The industrial CT scanning system according to claim 1, wherein the rotating table is further connected to a lifting device, which is a telescopic rod or a hydraulic cylinder, used for driving the rotating table to move up and down; and the lifting device is connected to the computer.

6. The industrial CT scanning system according to claim 1, wherein each of the control boxes is connected to a driving device; each of the three detectors is connected to another driving device; and the driving device and the another driving device are connected to the computer; each of the driving device and the another driving device is an air cylinder or a driving motor.

7. The industrial CT scanning system according to claim 1, further comprising a camera, wherein the camera is connected to the computer.

8. An industrial CT scanning method, comprising:
selecting a specimen detected to undergo a CT scanning test;
fixing the specimen detected to a sample bracket; and mounting the specimen detected on a rotating table;
turning on a camera through a computer;
based on a requirement of imaging magnification and another requirement of imaging quality, turning on three X-ray sources through the computer, and adjusting front and rear positions of the three X-ray sources and three detectors, as well as up and down positions of the rotating table, such that the three X-ray sources, the rotating table, and the three detectors are enabled to be determined at optimal imaging positions, wherein each of the three X-ray sources is mounted in a corresponding one of control boxes, a sliding rail is arranged below each of the control boxes; another sliding rail is arranged below each of the three detectors; each of the control boxes is mounted on the sliding rail through a respective rack and moved back and forth along the sliding rail; and each of the three detectors is mounted on the another sliding rail through another respective rack and moved back and forth along the another sliding rail;
adjusting sizes of openings of control boxes through the computer after the three X-ray sources, the rotating table, and the three detectors are determined to be at the optimal imaging positions, such that scattering angles of the three X-ray sources are controlled, wherein a front portion of each of the control boxes is formed with a corresponding one of the openings used for enabling X-rays emitted from a corresponding one of the three X-ray sources to pass; an electrically-controlled door is arranged at each of the openings of the control boxes; the electrically-controlled door is connected to the computer;
setting related parameters of CT scanning based on the another requirement of the imaging quality; starting scanning; enabling the specimen detected to rotate 120° along with rotation of the rotating table during scanning, so as to scan at different angles and obtain sliced gray scale images;
projecting X-rays emitted from each of the three X-ray sources to a corresponding one of the three detectors after the X-rays penetrate through the specimen detected in the CT scanning, wherein the three detectors convert and transmit projection data individually;
integrating and rearranging the projection data converted and transmitted by the three detectors during the scanning to reconstruct complete CT scanning projection data and obtain completed sliced gray scale images, based on a multi-source CT scanning graph reconstruction algorithm of the computer; and
ending the scanning, and reconstructing images with different gray scale values, which is obtained after ending the scanning, to be a complete three-dimensional image model of the specimen detected, through information processing and an image reconstruction technology of the computer.

* * * * *